(12) United States Patent
Milligan et al.

(10) Patent No.: US 7,107,272 B1
(45) Date of Patent: Sep. 12, 2006

(54) INDEPENDENT DISTRIBUTED METADATA SYSTEM AND METHOD

(75) Inventors: Charles A. Milligan, Golden, CO (US); Thomas Nelson Noland, Louisville, CO (US); Leslie K. Hodge, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 494 days.

(21) Appl. No.: 10/307,797

(22) Filed: Dec. 2, 2002

(51) Int. Cl.
*G06F 17/30* (2006.01)

(52) U.S. Cl. ............ 707/10; 707/100; 707/104.1; 707/103 R

(58) Field of Classification Search ............ 707/10, 707/100, 101, 102, 103 R, 104.1
See application file for complete search history.

(56) References Cited

U.S. PATENT DOCUMENTS

| | | | |
|---|---|---|---|
| 4,965,719 A | 10/1990 | Shoens et al. | 364/200 |
| 5,129,088 A * | 7/1992 | Auslander et al. | 711/1 |
| 5,403,639 A * | 4/1995 | Belsan et al. | 707/204 |
| 5,430,855 A * | 7/1995 | Walsh et al. | 710/10 |
| 5,435,004 A * | 7/1995 | Cox et al. | 707/205 |
| 5,761,526 A * | 6/1998 | Sakakura et al. | 710/1 |
| 5,897,661 A * | 4/1999 | Baranovsky et al. | 711/170 |
| 5,920,861 A * | 7/1999 | Hall et al. | 707/9 |
| 5,951,694 A | 9/1999 | Choquier et al. | 714/15 |
| 5,974,462 A | 10/1999 | Aman et al. | 709/225 |
| 6,085,198 A * | 7/2000 | Skinner et al. | 707/103 R |
| 6,138,119 A * | 10/2000 | Hall et al. | 707/9 |
| 6,209,002 B1 | 3/2001 | Gagne et al. | 707/204 |
| 6,230,183 B1 | 5/2001 | Yocom et al. | 709/105 |
| 6,477,544 B1 | 11/2002 | Bolosky et al. | 707/200 |
| 6,539,381 B1 | 3/2003 | Prasad et al. | 707/10 |
| 6,665,675 B1 | 12/2003 | Mitaru | 707/10 |
| 6,701,317 B1 * | 3/2004 | Wiener et al. | 707/10 |
| 6,779,016 B1 | 8/2004 | Aziz et al. | 709/201 |
| 6,779,094 B1 | 8/2004 | Selkirk et al. | 711/165 |
| 6,779,095 B1 | 8/2004 | Selkirk et al. | 711/165 |
| 6,801,949 B1 | 10/2004 | Bruck et al. | 709/232 |

(Continued)

OTHER PUBLICATIONS

Noland et al., Workload Balancing Using Dynamically Allocated Virtual Servers, May 17, 2002.

(Continued)

*Primary Examiner*—Frantz Coby
(74) *Attorney, Agent, or Firm*—Yee & Associates, P.C.

(57) ABSTRACT

An independent distributed metadata system and method are provided. With the system and method, metadata, which is associated with data at one or more data source locations, may be distributed independently of the data and manipulated independently to generate various computing environments. For example, a user may obtain a copy of metadata and use this metadata, at a remote location from the data source location, to create a computing environment, such as a virtual server, web page or the like. The computing environment created by the user consists entirely of metadata and does not include the actual data to which the metadata is associated. In this way, different users may have independent copies of the metadata and use it to generate their own computing environments without having to have access to the actual data. When the computing environment is to be implemented in a computing device, such as a server or servers on a network, the metadata defining the computing environment may be uploaded to the computing device. The computing device may then perform a verification of the metadata with the original metadata source location and download the corresponding data from the data source location. Thereafter, the computing environment may be made available for use via the server, the metadata and the data associated with the metadata.

25 Claims, 6 Drawing Sheets

U.S. PATENT DOCUMENTS

| | | |
|---|---|---|
| 6,804,755 B1 | 10/2004 | Selkirk et al. ............... 711/165 |
| 6,816,905 B1 | 11/2004 | Sheets et al. ............... 709/226 |
| 6,868,442 B1 | 3/2005 | Burdeau ..................... 709/223 |
| 6,944,785 B1 | 9/2005 | Gadir et al. .................... 714/4 |
| 2002/0053009 A1 | 5/2002 | Selkirk et al. ............... 711/162 |
| 2002/0069369 A1 | 6/2002 | Tremain ..................... 713/201 |
| 2002/0091872 A1 | 7/2002 | Bourke-Dunphy et al. . 709/316 |
| 2002/0120660 A1 | 8/2002 | Hay et al. ................... 709/100 |
| 2002/0178335 A1 | 11/2002 | Selkirk et al. ............... 711/162 |
| 2003/0005248 A1 | 1/2003 | Selkirk et al. ............... 711/165 |
| 2003/0217131 A1 | 11/2003 | Hodge et al. ............... 709/223 |
| 2004/0078533 A1* | 4/2004 | Lee et al. .................... 711/162 |

OTHER PUBLICATIONS

Hodge et al., Processing Distribution Using Instant Copy, May 17, 2002.

Selkirk et al., Apparatus and Method for Instant Copy of Data, Jun. 19, 2001.

Selkirk et al., Apparatus and Method for Instant Copy of Data in a Dynamically Changeable Virtual Mapping Environment, Jun. 19, 2001.

Milligan et al., Apparatus and Method for Customization of Environments Using Incremental Changes to Metadata, Jun. 25, 2002.

Buyya et al., "Single System Image (SSI)", Computing Applications, The International Journal of High Performance Computing Applications, Summer 2001, pp. 124-135.

* cited by examiner

INDEPENDENT DISTRIBUTED METADATA SYSTEM AND METHOD

RELATED APPLICATIONS

The present application is related to commonly assigned and copending U.S. patent application entitled "WORKLOAD BALANCING USING DYNAMICALLY ALLOCATED VIRTUAL SERVERS," Ser. No. 10/150,174, and U.S. patent application entitled "PROCESSING DISTRIBUTION USING INSTANT COPY," Ser. No. 10/147,831, both of which filed on May 17, 2002, U.S. patent application entitled "APPARATUS AND METHOD FOR INSTANT COPY OF DATA," Ser. No. 09/884,822, and U.S. patent application entitled "APPARATUS AND METHOD FOR INSTANT COPY OF DATA IN A DYNAMICALLY CHANGEABLE VIRTUAL MAPPING ENVIRONMENT," Ser. No. 09/884,687, both of which filed on Jun. 19, 2001, and U.S. patent application entitled "APPARATUS AND METHOD FOR CUSTOMIZATION OF ENVIRONMENTS USING INCREMENTAL CHANGES TO METADATA," Ser. No. 10/179,557, filed on Jun. 25, 2002, all of the above applications being hereby incorporated by reference.

BACKGROUND OF THE INVENTION

1. Technical Field

The present invention is directed to an independent distributed metadata system and method. More specifically, the present invention is directed to a system and method of metadata in which metadata may be distributed independently of the data to which it is associated and computing environments, data structures, and the like, may be created from this metadata.

2. Description of Related Art

In distributed data processing systems, multiple local copies of the same data element are often stored in different physical locations. For example, if a first computing device located in Chicago, Ill. has a particular set of data and a second computing device in Los Angeles, Calif. wishes to make use of this set of data, the second computing device must have its own local copy of the data which it can then operate on.

There are several drawbacks to keeping multiple copies of data. One drawback is increased resource consumption. These resources include transmission bandwidth, physical memory, and the like. That is, data must be transferred from the original location, thus incurring transmission expense. Once the data arrives at the new location, memory must be allocated for it.

Another problem with the current system of maintaining multiple local copies of data is that it becomes difficult to manage the multiple existing copies. For example, the various copies of the data must be maintained such that they are consistent with one another. As a result, whenever any data in any of the copies of the data is changed, the changes must be reported to every other computing device having a copy of that data. This leads to a variety of technical difficulties that must be handled. Furthermore, it creates a large amount of processing overhead to simply manage the various copies of the data.

As a result, it would be beneficial to have a system and method for allowing distributed access to data without requiring multiple copies of the data. Furthermore, it would be beneficial to have a system and method in which management of changes to data is simplified.

SUMMARY OF THE INVENTION

The present invention provides an independent distributed metadata system and method. With the system and method of the present invention, metadata, which is associated with data at one or more data source locations, may be distributed independently of the data and manipulated independently to generate various computing environments, create local copies or data sets and/or perform analysis to enable other actions.

For example, a user may obtain a copy of metadata and use this metadata, at a remote location from the data source location, to create a computing environment, such as a virtual server, web page or the like. The computing environment created by the user consists entirely of metadata and does not include the actual data to which the metadata is associated. In this way, different users may have independent copies of the metadata and use it to generate their own computing environments without having to have access to the actual data.

As another example, consider a kiosk that operates by using the metadata mechanisms of the present invention. Information need not be stored on the kiosk itself. The data my be located in a data source and may be accessed as needed through the use of metadata stored in the kiosk. This allows for a higher level of security since the actual data is not stored on the kiosk and cannot be accessed surreptitiously at the kiosk.

Furthermore, if a process running on the kiosk requires a large dataset, and the process is relatively small, the process can be sent to the data source and the results returned to the kiosk. Such a decision as to whether the dataset should be downloaded or the process should be uploaded may be performed on a case by case basis based on the metadata structures and mechanisms of the present invention. In this way, both the data transmission and memory use are minimized. In addition, the sending of the process rather than the data is more secure in such circumstances since the process will typically not include sensitive information that may be intercepted.

Using an independent metadata table, compiled from one or more data sources, to reference the location of data storage units forms an underlying principle of the present invention. In its simplest form, the metadata is merely the address of a unit of data storage, e.g., a track on a disk drive. The calling application looks up the files it requires in the table, finds the addresses of the tracks on which the files reside, and pulls the data off the tracks at the data source. The independent metadata table may be obtained, for example, using an instant copy operation or the like. An exemplary instant copy operation is described in U.S. patent application Ser. No. 09/884,822, entitled "Apparatus and Method for Instant Copy of Data."

The instant copy process may be used to generate copies of the metadata from the source metadata locations. These copies of metadata may be integrated into an independent metadata table that is usable at other locations. The instant copy process may further be used to generate an instant copy of the computing environment, data structures, etc., created using the independent metadata table compiled from the metadata source locations.

Further functionality may be garnered from the ability of the invention to operate from multiple versions of the metadata table. With multiple versions of the metadata table, a mechanism is provided for resolving discrepancies between versions such that the appropriate data is retrieved for use.

While the present invention may be used to create local copies of data subsets, performance analysis to enable other actions, and the like, the present invention may be especially suited to the creation of new computing environments remotely and/or offline, from the data source and/or servers on which the computing environments are to be resident. With the present invention, the computing environment may be generated completely as a subtable of the independent metadata table. That is, the user that is creating the new computing environment may select metadata representing the data that he/she wishes to utilize in the new computing environment, from the independent metadata table and store it as part of a subtable that includes only the metadata of the data for the new computing environment. Thus, the new computing environment is completely defined by this subtable metadata data structure which is independent of the actual data to which the metadata corresponds.

When the computing environment is to be implemented in a computing device, such as a server or servers on a network, the metadata defining the computing environment may be uploaded to the computing device. The computing device may then perform a verification of the metadata with the original metadata source location and download the corresponding data from the data source location. Thereafter, the computing environment may be made available for use via the server, the metadata and the data associated with the metadata. In this way, only when a computing environment is to be implemented is any transfer of data, or even the presence of the data, required. Prior to actual implementation of the computing environment, functions are performed based on the metadata only.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a mechanism for independent copies of metadata to be used to create computing environments independent of the actual data used to generate these environments. With the present invention, copies of metadata are distributed to users for use at remote locations. This metadata may then be manipulated by the users to create their own custom or personalized computing environments based solely on the metadata distributed to them. Once their computing environment is ready to be implemented, the user need only upload the metadata defining the computing environment to a server or servers on which the environment is to reside and the computing environment will be implemented. With the present invention, each user may have their own copy of the metadata that exists independently of the other copies.

The present invention is especially advantageous when used in a distributed computing environment, such as a network. Accordingly, the detailed description of the embodiments of the present invention will first provide a brief explanation of an exemplary distributed computing environment in which the present invention may be implemented and then will discuss the details of how the present invention is implemented in such a distributed computing environment.

Figure 1:
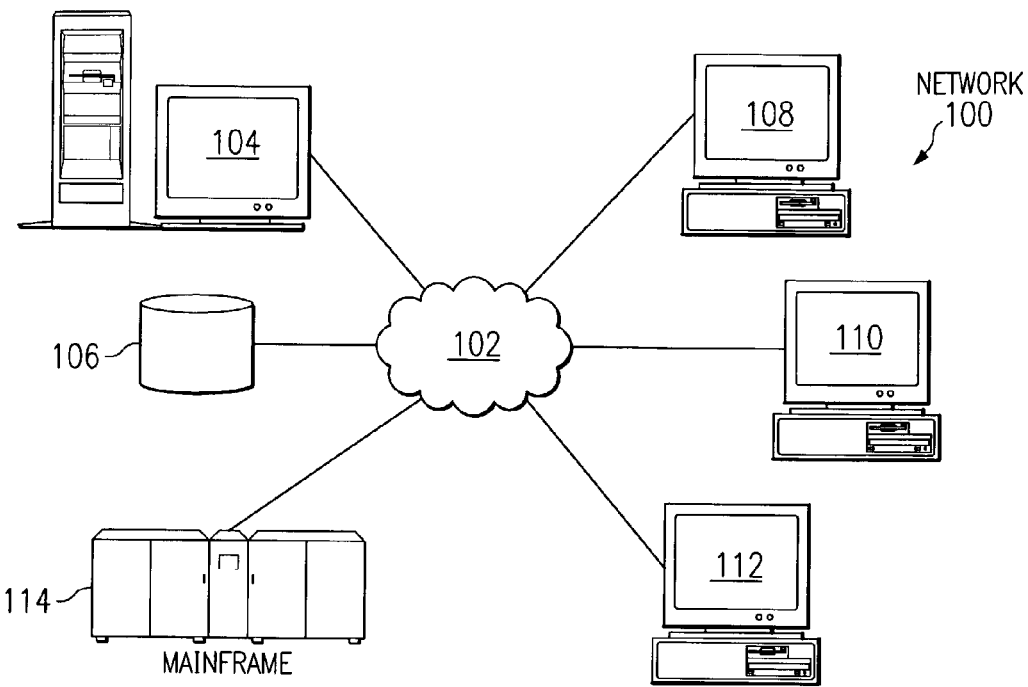
FIG. 1 is an exemplary block diagram of a network computing environment in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with mainframe 114 and storage unit 106. In addition, clients 108, 110, and 112 also are connected to network 102. These clients 108, 110, and 112 may be, for example, personal computers or network computers. In the depicted example, server 104 and mainframe 114 may provide data, such as boot files, operating system images, and applications to clients 108–112. In addition, mainframe 114 may host one or several virtual servers. Clients 108, 110, and 112 are clients to server 104 and mainframe 114. Network data processing system 100 may also include additional servers, clients, and other devices not shown (e.g., printers).

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
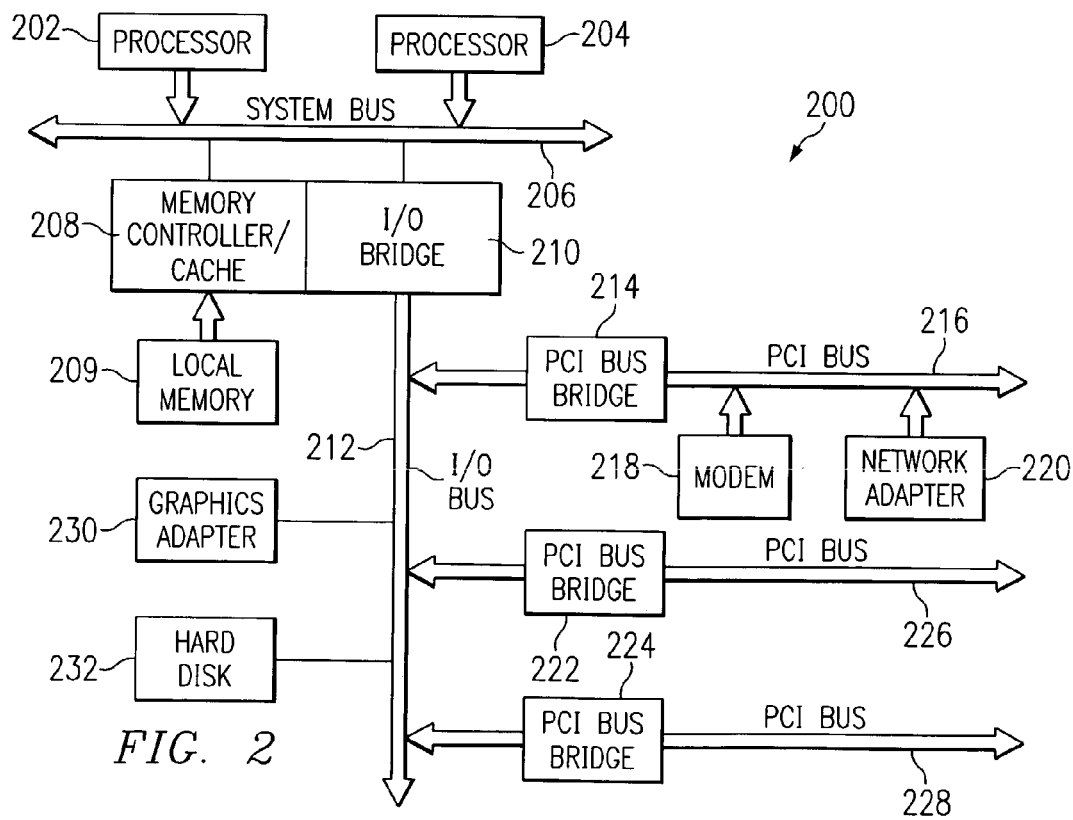
FIG. 2 is an exemplary block diagram of a storage subsystem in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary and could indeed be a mainframe architecture rather than the depicted architecture. In addition, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
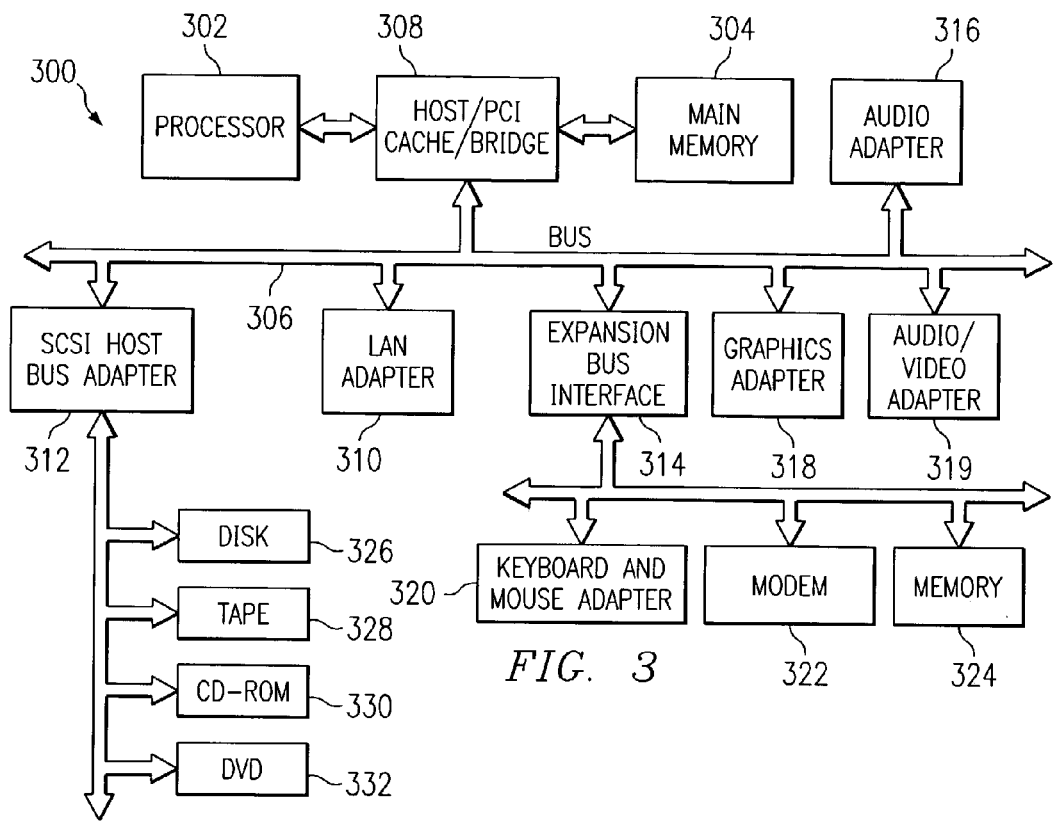
FIG. 3 is an exemplary diagram illustrating a client device in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As discussed previously, the present invention provides an independent distributed metadata system and method. With the system and method of the present invention, metadata, which is associated with data at one or more data source locations, may be distributed independently of the data and manipulated independently to generate various computing environments, data structures, local copies of data subsets, perform analysis to enable other actions, and the like.

For example, a user may obtain a copy of metadata and use this metadata, at a remote location from the data source location, to create a computing environment, such as a virtual server, web page or the like. The computing environment created by the user consists entirely of metadata and does not include the actual data to which the metadata is associated. When the application is run, the actual data may be transferred to the application site or called into memory at the application site as needed. In this way, different users may have independent copies of the metadata and use it to generate their own computing environments without having to have access to the actual data.

When the computing environment is to be implemented in a computing device, such as a server or servers on a network, the metadata defining the computing environment may be uploaded to the computing device. The computing device may then perform a verification of the metadata with the original metadata source location and download the corresponding data from the data source location. Thereafter, the computing environment may be made available for use via the server, the metadata and the data associated with the metadata. In this way, only when a computing environment is to be implemented is any transfer of data, or even the presence of the data, required. Prior to actual implementation of the computing environment, functions are performed based on the metadata only.

Alternatively, remote locations may be provided with metadata tables according to the present invention, upon which local applications operate to determine actions to perform. For example, an application on a local computing device may interact with a user to obtain information that is used to determine a subset of the metadata table required for performing a desired action. From this subset of the metadata table, the actual data may be retrieved from the data source or determinations regarding actions to be performed by the application may be made. For example, if the data required to provide the desired action would result in excessive amounts of data being transmitted, large delay, sensitive data being transmitted, or the like, a determination may be made to send the application in various forms. These forms may include, but not be limited to, an executable version of the application, the application source code, the application source code coupled with a specific compiler or other forms.

The key concept with each alternative embodiment of the present invention is that the metadata is distributed independently of the data to which it corresponds. Thus, remote computing devices may perform operations on the metadata independent of the data itself. It is only when the actual data is needed that the metadata may be used to retrieve the actual data to perform operations, create local copies of data sets, create new computing environments and the like.

For purposes of the present description, it will be assumed that the metadata structures and operations on these metadata structures are performed to generate a new computing environment. However, as noted above, the present invention is not limited to use in generating new computing environments. Any application of the present invention that may benefit from the distribution and manipulation of metadata data structures independent of the data with which the metadata is associated, is intended to be within the spirit and scope of the present invention.

The concepts and mechanisms of the present invention may be used in conjunction with, and may build on, the features and mechanisms described in co-pending and commonly assigned U.S. patent application Ser. Nos. 10/150,174, 10/147,831, and 10/179,557, which have been incorporated herein by reference. In these applications, mechanisms are described for generating new server instances using an instant copy operation and customizing these new server instances. The present invention expands upon this concept by providing a mechanism to not only generate copies and customized versions of server instances, but to do so independent of the underlying server instance data and its associated metadata. As a result, with the present invention, computing environment developers may generate computing environments using localized versions of metadata independent of any changes to the actual data and/or metadata at the source.

Figure 4:
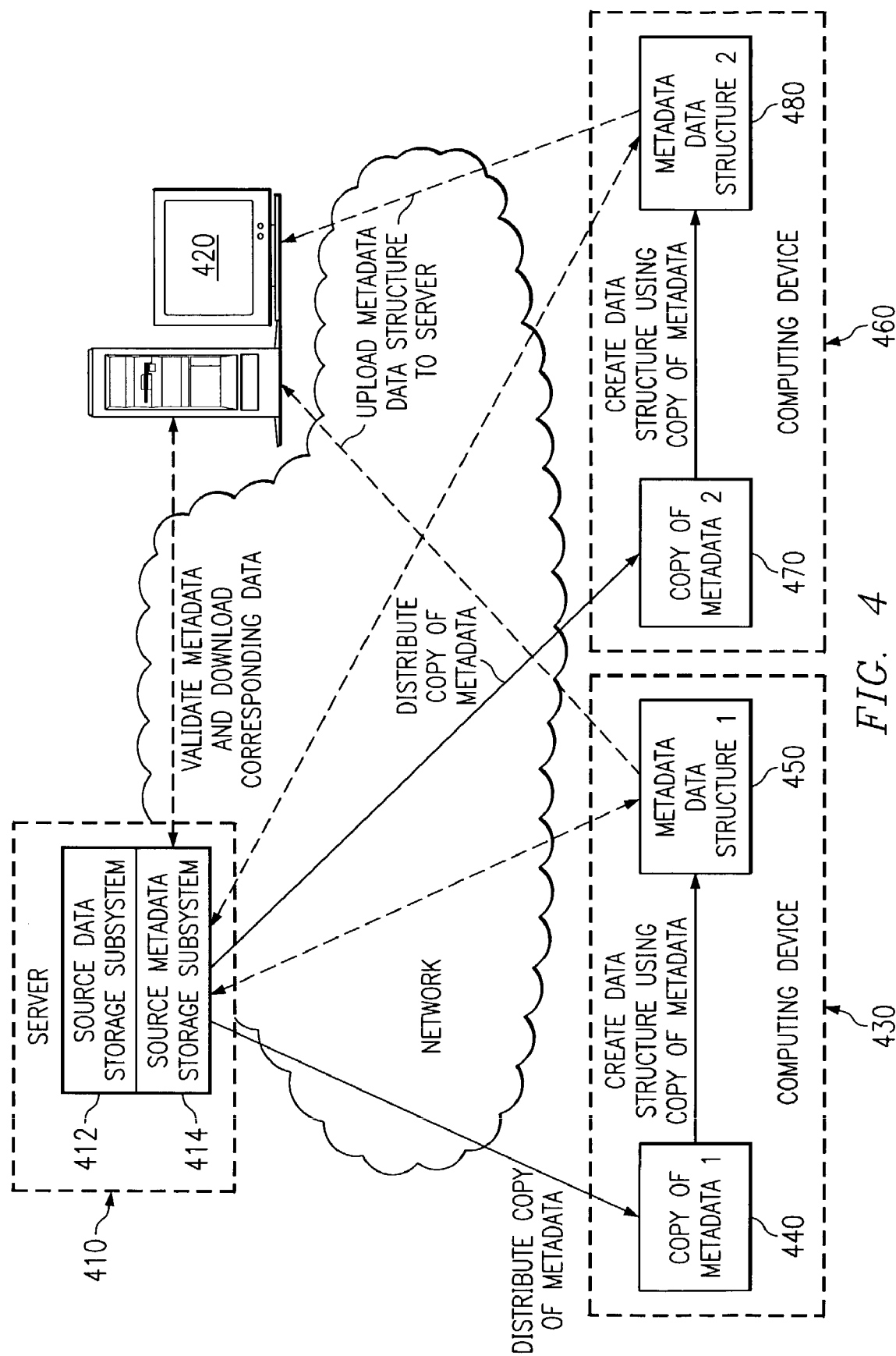
FIG. 4 is an exemplary diagram illustrating data flow between the elements of a distributed data processing system in accordance with the present invention.

Referring now to FIG. 4, an exemplary diagram illustrating data flow between the elements of a distributed data processing system in accordance with the present invention is provided. As shown in FIG. 4, a server 410 is provided that includes a source data storage subsystem 412 and a source metadata storage subsystem 414. The source metadata storage subsystem 414 stores metadata that is associated with actual data stored in the source data storage subsystem 412. This metadata may include many different forms of data about the associated data stored in the source data storage subsystem 412. For example, the metadata may include pointers to the associated data in the source data storage subsystem 412, thumbnail images of the data, data fingerprints, version or journaling information, timestamp information, synopsis information, pointers to other structures outside the data storage subsystem, and the like.

Copies of the metadata in the source metadata storage subsystem, or portions thereof, may be distributed to other devices such as remotely located computing devices 430 and 460. The copies of the metadata may be created using an instant copy operation, such as that described in the incorporated U.S. patent application Ser. No. 09/884,822, or by other methods. The copies of metadata may be distributed in any way deemed appropriate for the particular situation. For example, the copies of metadata may be transmitted across a network, such as depicted in FIG. 4, stored on a removable media and transported to the computing devices 430 and 460, or the like.

Regardless of the particular mechanism used to distribute the copies of the metadata, the computing devices 430 and 460 are provided with copies of the metadata 440 and 470 that are remotely located from the source metadata storage device 414. These copies of metadata 440 and 470 exist independent of one another and independent of the metadata in the source metadata storage subsystem 414. Thus, a user may manipulate these copies of metadata 440 and 470 without any impact or need to synchronize the copy of metadata 440 and 470 with the other copies of metadata or with the metadata in the source metadata storage subsystem 414. As a result, a user may make use of his or her independent copy of metadata to generate new computing environments, new data structures, perform operations in which only the metadata is necessary, and the like, without any concern that their manipulation of the metadata will somehow impact other copies of metadata or the source metadata.

As noted above, this metadata may include thumbnails, synopsis information, and the like, that would provide a user with sufficient information for ascertaining the nature of the data in the source data storage subsystem 412 associated with the metadata. From the metadata, e.g., metadata 440, a user of a computing device, e.g., computing device 430, may determine various combinations of metadata that are desirable for creating one or more computing environments, data structures, perform particular actions, and the like.

In the exemplary embodiment depicted, the user of the computing device 430 is assumed to select a portion of the metadata from the copy of the metadata 440, the portion being stored as a metadata data structure 450. Similarly, metadata data structure 480 may be generated by a user that selects and manipulates the metadata of the copy of the metadata 470. For example, the metadata data structures 450 and 480 may represent a new computing environment that is to be deployed on server 420 or on the individual computing devices 430 and 460.

The user may make use of an application resident on the computing device 430 or 460 for reading the copy of metadata 440 or 470 and providing a depiction of the metadata 440 or 470 for use by the user in creating the new computing environment. Such an application may provide a graphical user interface through which the user may manipulate the metadata 440 or 470, select which portions of metadata are to be included in the new computing environment, and the like. Such a graphical user interface may provide, for example, the thumbnails, summary information, and the like, to the user for the user's viewing and possible selection to include in the new computing environment. The application may then provide a mechanism for storing a data structure, i.e. metadata data structure 450 or 480, corresponding to the new computing environment. The term "data structure" as it is used herein refers to an aggregation of data that may be implemented as one or more databases, file structures, data warehouses, or the like. The metadata data structures 450 and 480 are aggregations of metadata that are associated with data stored in the source data storage subsystem 412.

Thus, with the present invention, the new computing environments, new local data sets, or the like, exist entirely as a metadata data structure 450 or 480 comprised of a subset of the copies of the metadata 440 or 470, respectively. For example, the computing environment defined by metadata data structure 450 may exist as a data structure comprised of background pattern metadata, foreground color scheme metadata, logo metadata, textual content metadata, presentation fill metadata, icon design metadata, hot link design metadata, database controls metadata, and the like, which together form a computing environment such as a web page or server instance.

When this computing environment is to be deployed on a computing device, such as server 420, the metadata data structure 450 or 480 defining the computing environment may be uploaded to the server 420 to implement the new computing environment. The server 420 may be the same computing device as server 410 or may be a different device as depicted. Alternatively, the computing devices 430 and 460 may implement the new computing environment themselves and thus, the need for server 420 is eliminated.

Assuming that the computing environment is to be implemented by the server 420, the server 420 receives the uploaded metadata data structure 450 or 480 that defines the new computing environment. The metadata data structure 450 or 480 preferably provides information identifying the source of the original metadata used to generate the copy of metadata 440 or 470 from which the metadata data structure 450 or 480 was created, i.e. source metadata storage subsystem 414. Based on this identification information in the metadata data structure, the server 420 performs version verification with the server 410.

Version verification is essentially intended to resolve any differences between the metadata being used in the metadata data structure 450 or 480 any currently existing metadata in the source metadata storage subsystem 414. In other words, there may have been changes to the metadata in the source metadata storage subsystem 414 and/or to the data in the source data storage subsystem 412 after the copies of the metadata 440 and 470 were distributed to the computing devices 430 and 460. Alternatively, the users of computing devices 430 and 460 may be using an older or no longer current version of the metadata.

The metadata in the copy of the metadata 440 and 470 also preferably include timestamp data identifying the date and time that the copy of metadata 440, 470 was created from source metadata in the source metadata storage subsystem 414. In order to perform the version verification, a closest matching version of source metadata is identified and then the timestamp of the closest matching version of source metadata is compared to the timestamp on the metadata for the new computing environment. If there is a difference between the two timestamps, a determination must be made as to how to resolve the difference in metadata.

The differences between versions of metadata may be resolved in the following ways. First, if a previous version of metadata and its corresponding data has been archived, the previous data may be used to generate the new computing environment, local data set, etc. Using this approach, the creator of the new computing environment, for example, is provided with the actual data that was associated with the metadata used to create the new computing environment. As a result, the new computing environment will be implemented in a manner consistent with the intent of the creator of the new computing environment.

In an alternative resolution, the current version of the data may be utilized. While this alternative provides a different computing environment, local data set, etc., from the one intended by the creator, it may be more desirable than the one intended by the creator and will be consistent with other computing environments, local data sets, etc., generated. For example, a logo or standard background may have been modified since the metadata was distributed and for consistency, this new logo and background may be used in the new computing environment even though the metadata for the new computing environment points to a different logo and background.

In yet another alternative resolution, the choice of whether to use the current data and/or metadata or to retrieve an archived version of the data and metadata may be given to the creator of the new computing environment, local data set, etc. The choice may also be provided to a user that is implementing the new computing environment, local data set, etc. on the server 420, for example. This alternative assumes that older versions of metadata and its associated data are archived and can be retrieved for use in generating the new computing environment, for example. The choice may be made through on-screen prompts, through preferences files, or the like.

Once the version verification is completed and a determination is made as to how to resolve any differences between versions of metadata, the data corresponding to the metadata data structure 450 or 480 is transmitted to the server 420. The server 420 may then use this data along with the metadata in the metadata data structure 450 or 480 to generation the new computing environment, local data set, etc. on the server 420.

As noted above, rather than sending the metadata data structures 450 and 480 to the server 420, the metadata data structures 450 and 480 may be maintained at the computing devices 430 and 460. In such an embodiment, the version verification and data transmissions are performed between the server 410 and the computing devices 430 and 460 without intervention by the server 420.

Thus, with the present invention, only metadata is transferred between the computing devices 430 and 460 and the servers 410 and 420. The only point in the above process for creating a new computing environment where actual data is exchanged is when the new computing environment is ready to be deployed and the data must be transmitted from the server 410 to the server 420 on which the new computing environment is to be deployed.

Figure 5:
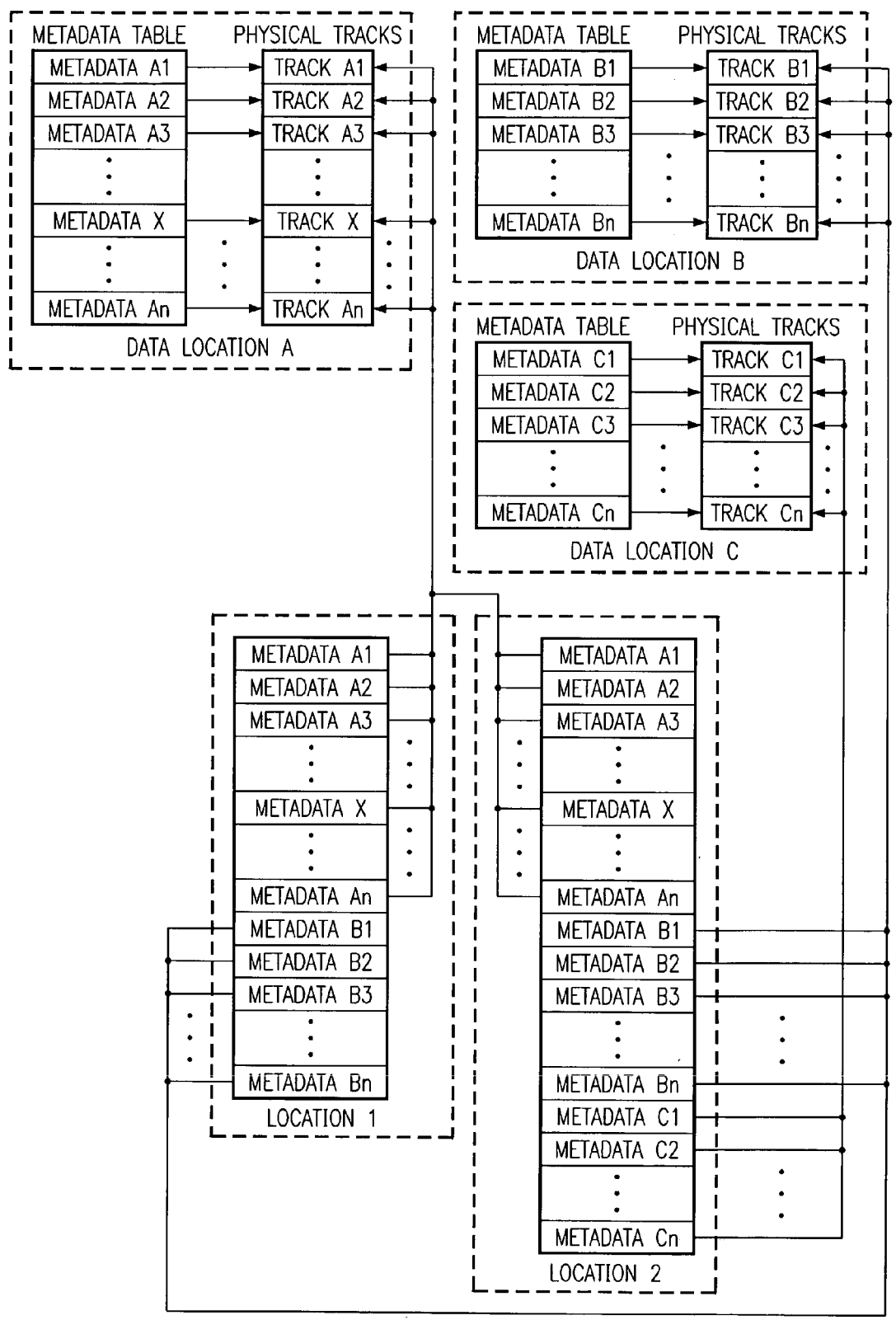
FIG. 5 is an exemplary diagram illustrating the relationship between metadata at data source locations and the independent metadata tables of the present invention.

FIG. 5 is an exemplary diagram illustrating the correlation between source data and metadata and independent copies of metadata in accordance with the present invention. This example illustrates metadata that includes pointers to physical tracks on a storage device. In this example, shown in FIG. 5, three source data locations are depicted, data location A, data location B and data location C. Each of these locations stores data in physical tracks, such as tracks A1–An, tracks B1–Bn, and tracks C1–Cn. It should be appreciated that the tracks may exist on different physical media, such as, for example, in a RAID or RAIT system where data is striped across a plurality of media.

A metadata table exists at each location that stores metadata elements corresponding to the data on the physical tracks. That is, the metadata table of data location A includes metadata elements A1–An that point to and describe the data stored in tracks A1–An. By identifying the metadata elements associated with the data that is desired to be accessed, a storage subsystem controller may issue commands to mount and load the data for use even when the data is on different physical media.

With the present invention, the tables of metadata at the data locations are distributed to other locations 1 and 2. For example, data location A and data location B, in the depicted example, have distributed copies of their metadata tables to locations 1 and 2 while data location C has distributed a copy of its metadata table to only location 2. As discussed previously, one mechanism for making the copies of the metadata tables at the data locations is to use an instant copy operation, such as SnapShot.

The metadata tables are combined into a composite metadata table at the locations 1 and 2. Thus, the metadata table at location 1 comprises the metadata elements A1–An and B1–Bn, while the metadata table at location 2 comprises the elements A1–An, B1–Bn and C1–Cn. These composite metadata tables may then be used to create local data sets, new computing environments, perform analysis and other operations, at the locations 1 and 2. For example, a user at location 1 may select metadata elements A1, X, B1, B3 and B25 to be part of a local data set metadata data structure or to be part of a new computing environment metadata data structure. This metadata data structure may then be used to retrieve only the data associated with the metadata in the metadata data structure, rather than the entire set of data from data locations A and B, as would be required in prior art systems.

Thus, the use of the metadata tables at the locations 1 and 2 may be done without requiring a copy of the actual data from each of the data locations A, B and C. Because the tie between the metadata and the actual data is temporarily severed through independent distribution of copies of the metadata that identifies the data at data locations A, B and C, the metadata may be used independently to perform functions at remote locations and the data only retrieved during a final stage of the operation at the remote location from the use of the data.

As shown in FIG. 5, the copies of the metadata tables point to the physical data storage locations, e.g., track A2, track B3, track C1, etc., and thus, when the metadata is used by the systems at locations 1 and 2, the locations 1 and 2 must issue a request for the actual data from the data locations A, B and C. Therefore, the metadata includes an identification of the data locations, e.g., a network address, Internet Protocol address, etc., which may be used to transmit a message to the data location requesting mounting, loading and transmission of the data to the location where the copy of the metadata is stored. Once the data is retrieved, operations may be performed on the data to instantiate the new computing environment, create the local data set, perform analysis, and the like.

While FIG. 5 illustrates the copies of metadata pointing to the physical storage locations of the data at the various data locations, the present invention is not limited to such. Rather, the copies of metadata may be metadata that points to corresponding metadata elements in the metadata tables of the data locations A, B and C. Thus, the copies of metadata at locations 1 and 2 may be meta-metadata. As a result, when data is to be retrieved from the data locations, the meta-metadata is used to identify the metadata elements in the metadata tables of the data locations, which are in turn used to mount, load and transmit the data from the physical tracks to the locations 1 and 2. The metadata in this example refers to tracks on a storage device. Other implementations are equally possible, such tables of pointers to files, database records, or other data structures.

Figure 6:
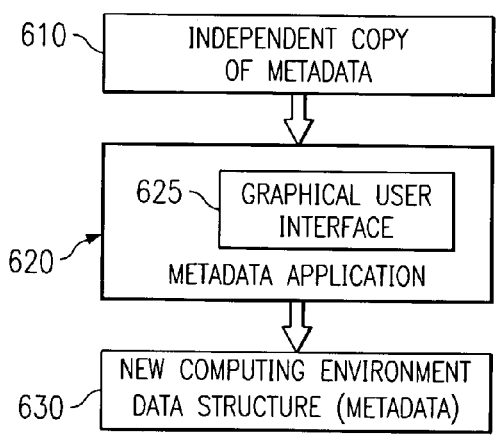
FIG. 6 is an exemplary diagram illustrating the creation of a computing environment using an independent copy of metadata from a metadata source location.

FIG. 6 is an exemplary diagram illustrating the creation of a computing environment using an independent copy of metadata from a metadata source location. As shown in FIG. 6, the metadata 610 is provided to an application 620 having a graphical user interface 625. The user then uses the graphical user interface 625 to view the metadata 610 and create a new computing environment by selecting various portions of the metadata 610. The application 620 then generates a data structure 630 that defines the new computing environment. The data structure 620 is comprised only of metadata selected from the metadata 610.

Figure 7:
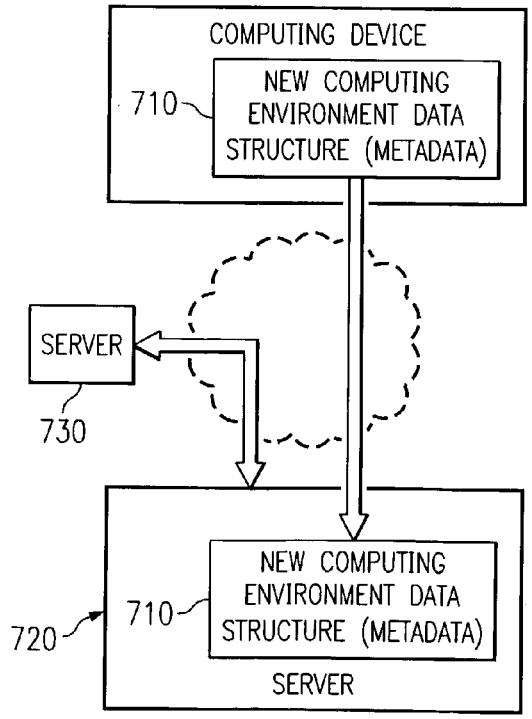
FIG. 7 is an exemplary diagram illustrating a verification of metadata for a computing environment when the computing environment is to be implemented.

FIG. 7 is an exemplary diagram illustrating a verification of metadata for a computing environment when the computing environment is to be implemented. As shown in FIG. 7, a data structure 710 representing a new computing environment is received from a remote computing device. The data structure 710 includes only metadata defining the new computing environment. The metadata includes version information and timestamp information which may be compared to source metadata to determine if any modifications to the source metadata have occurred since the metadata for the new computing environment was distributed.

The server 720 transmits a request to the server 730 for verification based on the version and timestamp information from the metadata in the data structure 710. The results of the verification are returned to the server 720 which indicate whether the versions and timestamps match or not.

If not, a determination is made as to how to resolve the differences between the versions of metadata. The server 720 may transmit a query to the server 730 asking if the server 730 archives old versions of metadata and its associated data and/or whether the particular version and timestamp of the metadata for the new computing environment is archived. If so, this data may be retrieved and used to generate the new computing environment. Alternatively, based on a preferences file or through direct user prompting, a user may identify whether to use the current data or retrieve an archived version of the data.

Figure 8:
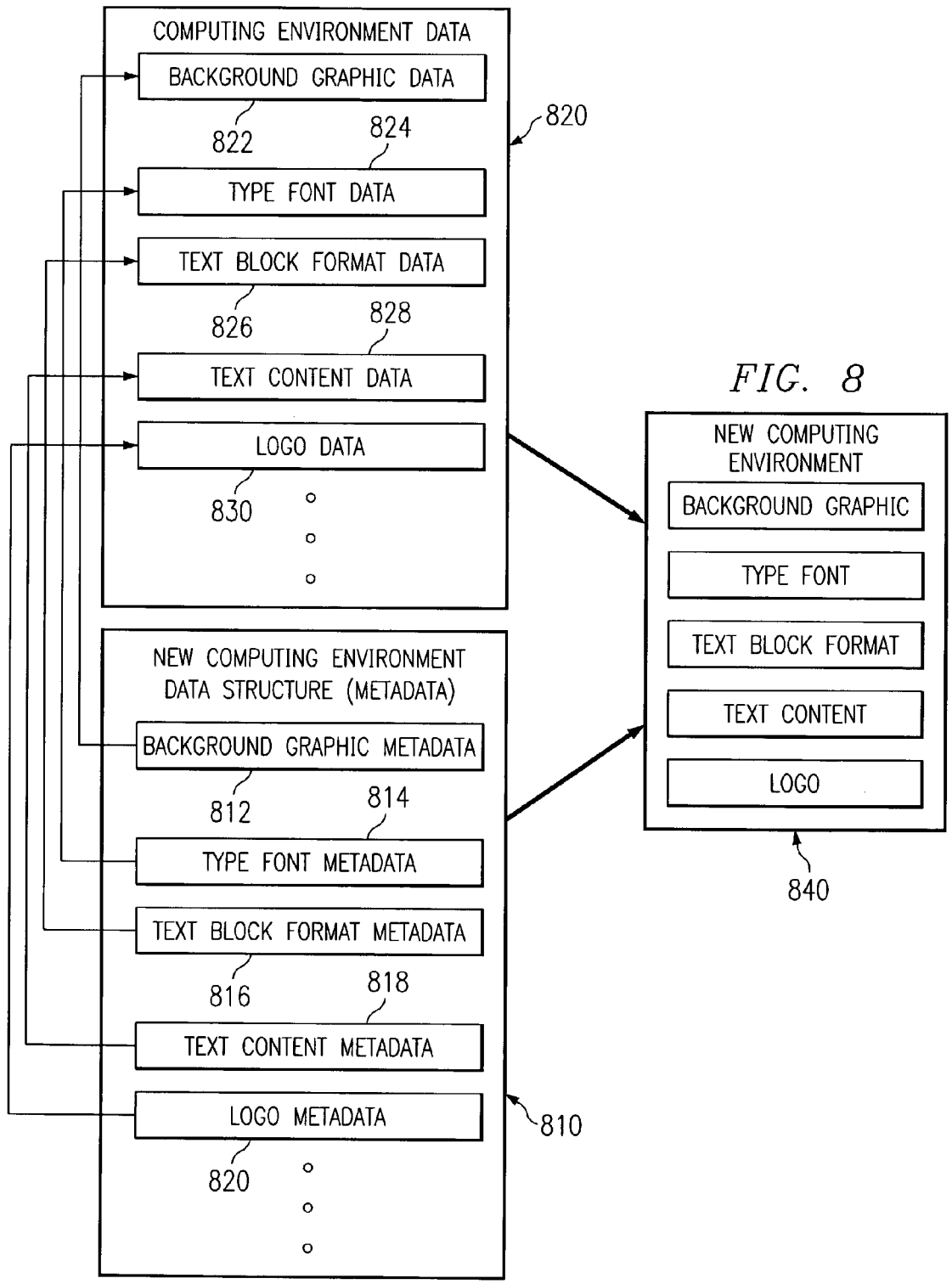
FIG. 8 is an exemplary diagram illustrating the implementation of a computing environment created using only an independent copy of metadata.

FIG. 8 is an exemplary diagram illustrating the implementation of a computing environment created using only an independent copy of metadata. As shown in FIG. 8, in this example implementation of the present invention, the data structure 810 includes metadata corresponding to background graphic 812, type font 814, text block format 816, text content 818, logo 820, and the like. Following version verification and resolution of differences between versions of metadata, the new computing environment is generated by transmitting a copy of the data 820 in the source data storage subsystem to the server on which the new computing environment is to be implemented. In the depicted example, the metadata identifies the particular way in which this data is to be combined to form the new computing environment 840.

As shown in FIG. 8, the data 820 includes background graphic data 822, type font data 824, text block format data 826, text content data 828, logo data 830, and the like. Using this data and the metadata 810, a new computing environment 840 may be generated and deployed. This new computing environment will have background graphics, type fonts, text block formats, text content, logos, and the like, corresponding to the data 820 combined in the manner described by the metadata 810.

Figure 9:
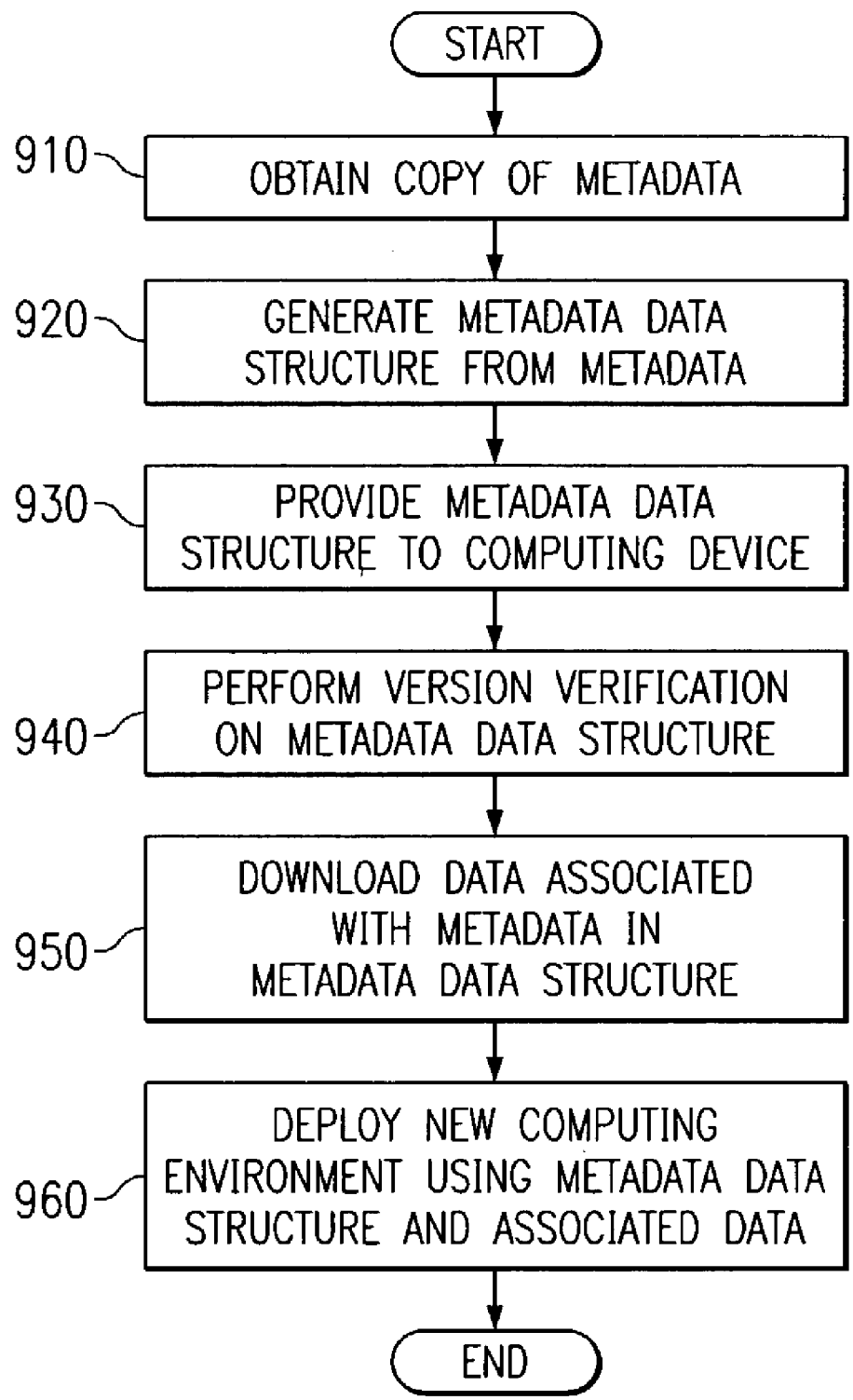
FIG. 9 is a flowchart outlining an exemplary operation of the present invention.

FIG. 9 is a flowchart outlining an exemplary operation of the present invention. As shown in FIG. 9, the operation starts with obtaining a copy of metadata from a source metadata storage subsystem (step 910). The copy of metadata is then used to generate a data structure representing a new computing environment (step 920). This data structure is comprised only of metadata and does not include the actual data that will be used to implement the new computing environment on a computing device.

Thereafter, the data structure is provided to a computing device on which the new computing environment is to reside (step 930). The computing device performs version verification with the source metadata storage subsystem (step 940) and downloads the data associated with the metadata in the data structure that defines the new computing environment (step 950). The computing device then deploys the new computing environment (step 960). The new computing environment may be deployed, for example, in a manner similar to that described in the incorporated U.S. U.S. patent application Ser. Nos. 10/150,174, 10/147,831, and 10/179,557.

It should be appreciated that while the above embodiments assume that the metadata comes from a single source metadata storage subsystem, the present invention is not limited to such. Rather, since the metadata includes information regarding its source, the metadata may be compiled from a plurality of different sources. During version verification, the necessary information for performing the version verification can be obtained from each of these plurality of different sources since the metadata includes source identification information.

Thus, the present invention provides a mechanism for independent distribution of metadata which may be used to create computing environments independent of other copies of the metadata. With the present invention, computing environment developers may operate completely based on their independent copy of the metadata to create new computing environments without concern as to how their manipulation of metadata would impact other users since their copy of metadata is independent of other copies of metadata.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method of distributing data, comprising:
identifying data, that is stored in a first location, that is to be used in at least one location that is different from said first location;
said data being described by metadata;
generating a copy of said metadata;
providing said copy to a destination device in said at least one location without copying said data to said at least one location; and
manipulating, by said at least one location, said copy of said metadata independently from said data to create a computing environment.

2. The method of claim 1, wherein generating the copy of the metadata includes using an instant copy operation to generate the copy of the metadata.

3. The method of claim 1, further comprising:
manipulating the copy of the metadata to generate a metadata data structure defining a subset of the data; and
utilizing the metadata data structure to generate said computing environment.

4. The method of claim 1, further comprising:
said metadata being stored in a metadata source device; and
wherein the destination device is remotely located from the metadata source device.

5. The method of claim 1, wherein providing the copy of the metadata to a destination device includes distributing the copy of the metadata by at least one of transmission media and a physical storage media.

6. The method of claim 1, wherein manipulating the copy of the metadata includes selecting one or more metadata elements from the copy of the metadata for inclusion in a metadata data structure that includes a subset of the metadata in the copy of the metadata.

7. The method of claim 1, further comprising:
manipulating the copy of the metadata to generate a metadata data structure defining a subset of the data;
uploading the metadata data structure to a server;
verifying the metadata data structure with the metadata source device; and
retrieving the subset of the data from a data source.

8. The method of clam 1, further comprising:
manipulating the copy of the metadata to generate a metadata data structure defining a subset of the data;
determining whether to retrieve the subset of data from a data source based on the metadata data structure; and
uploading the metadata data structure ad an application to the data source, if it is determined to not retrieve the subset of data from the data source.

9. The method of claim 8, wherein determining whether to retrieve the subset of data from the data source includes determining if retrieving the subset of data will result in one of excessive amounts of data being transmitted, large delay, and sensitive data being transmitted.

10. A system for distributing data, comprising:
data, that is stored in a first location that is to be used in at least one location that is different from said first location;
said data being described by metadata;
a copy of said metadata being generated;
means for providing said copy to a destination device in said at least one location without copying said data to said at least one location; and
said different location manipulating said copy of said metadata independently from said data to create a computing environment.

11. The system of claim 10, further comprising an instant copy operation for generating the copy of the metadata.

12. The system of claim 10, further comprising:
the copy of the metadata being manipulated to generate a metadata data structure defining a subset of the data; and
wherein the metadata data structure is utilized to generate said computing environment.

13. The system of claim 10, further comprising:
a metadata source device for storing said metadata; and
wherein the destination device is remotely located from the metadata source device.

14. The system of claim 10, wherein the means for providing the copy of the metadata to a destination device includes means for distributing the copy of the metadata by at least one of transmission media and a physical storage media.

15. The system of claim 10, wherein the different location for manipulating the copy of the metadata includes means for selecting one or more metadata elements from the copy of the metadata for inclusion in a metadata data structure that includes a subset of the metadata in the copy of the metadata.

16. The system of claim 10, further comprising:
the copy of the metadata being manipulated to generate a metadata data structure defining a subset of the data;
means for uploading the metadata data structure to a server;
means for verifying the metadata data structure with the metadata source device; and
means for retrieving the subset of the data from a data source.

17. The system of claim 10, further comprising:
the copy of the metadata being manipulated to generate a metadata data structure defining a subset of the data;
means for determining whether to retrieve the subset of data from a data source based on the metadata data structure; and
means for uploading the metadata data structure and an application to the data source, if it is determined to not retrieve the subset of data from the data source.

18. The system of claim 17, wherein the means for deter whether to retrieve the subset of data from the data source includes means for determining if retrieving the subset of data will result in one of excessive amounts of data being transmitted, large delay, and sensitive data being transmitted.

19. A method, in a computing device, for generating a computing environment, comprising:
identifying data, that is stored in a first location in a metadata source device, that is to be used in at least one location that is different from said first location, said at least one location being located in a computing device;
said data being described by metadata;
receiving a copy of said metadata from metadata source device;
said copy being received in said at least one location without receiving said data in said at least one location; and
manipulating, by said at least one location, the copy of metadata independently from said data to create a computing environment.

20. The method of claim 19, wherein the copy of the metadata is generated using an instant copy operation.

21. The method of claim 19, wherein the computing device is remotely located from the data source location.

22. The method of claim 19, wherein receiving a copy of metadata includes receiving a copy of the metadata via at least one of a transmission media and a physical storage media.

23. The method of claim 19, her comprising:
manipulating, by said at least one location, the copy of metadata to generate a metadata data structure defining a local data set;
generating the local data set using the metadata data structure and data from the data source location associated with metadata in the metadata data structure; and
wherein manipulating the copy of the metadata includes selecting one or more metadata elements from the copy of the metadata for inclusion in the metadata data structure that includes a subset of the metadata in the copy of the metadata.

24. An apparatus for generating a computing environment, comprising:
means for identifying data, that is stored in a first location in a metadata source device, that is to be used in at least one location that is different from said first location, said at least one location being located in a computing device;
said data being described by metadata;
means for receiving a copy of said metadata from said metadata source device
said copy being received in said at least one location without receiving said data in said at least one location; and
said at least one location for manipulating the copy of metadata independently from said data to create a computing environment.

25. A computer program product in a computer readable medium for generating a computing environment, comprising:
instructions for identifying data, that is stored in a first location in a metadata source device, that is to be used in at least one location that is different from said first location, said at least one location being located in a computing device;
said data being described by metadata;
instructions for receiving a copy of said metadata from said metadata source device;
said copy being received in said at least one location without receiving said data in said at least one location; and
instructions for manipulating, by said at least one location, the copy of metadata independently from said data to create a computing environment.

* * * * *